United States Patent Office 3,053,841
Patented Sept. 11, 1962

3,053,841
BASIC ETHERS OF 7-ISOXAZOLYL-4-HYDROXY-9 - METHOXY - 5H - FURANO [3,2-g][1] BENZOPYRAN-5-ONES
Carlo Musante, 13 Via Buonvicini, Florence, Italy
No Drawing. Filed Jan. 9, 1961, Ser. No. 81,259
Claims priority, application Switzerland Jan. 19, 1960
7 Claims. (Cl. 260—247.5)

The present invention concerns new basic ethers which have valuable pharmacological properties. It also concerns hydroxy compounds which form the basis of such ethers, i.e. new 7-substituted 4-hydroxy-9-methoxy-5H-furano[3,2-g][1]benzopyran-5-ones as well as a process for the production of these new compounds.

It has been found that valuable new basic ethers are obtained by condensing, by means of an alkali metal, alkali hydride, alkali amide or alkali alcoholate, khellinone (4,7-dimethoxy-5-acetyl-6-hydroxy-benzofuran) and a low molecular alkyl ester of 5-methyl-isoxazole-3-carboxylic acid or 3-methyl-isoxazole-5-carboxylic acid, to form a compound of the general formula

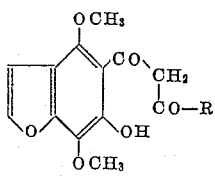

wherein R represents the 5-methyl-isoxazolyl-(3) or the 3-methyl-isoxazolyl-(5) radical, converting this compound by treatment with an agent which splits off water to form a compound of the general formula

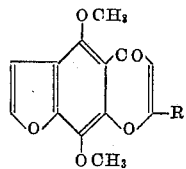

partially hydrolysing this latter compound, advantageously by means of hydrochloric acid or hydrobromic acid, to form a 7-substituted 4-hydroxy-9-methoxy-5H-furano-[3,2-g][1]benzopyran-5-one of the general formula

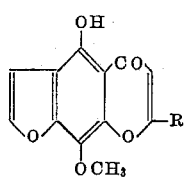

and, if desired, reacting this, in the presence of an acid binding agent, with a reactive ester of a basic alcohol of the general formula

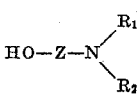

wherein $R_1$ and $R_2$ represent low molecular alkyl radicals which can be bound to each other direct or by way of an oxygen atom, and Z represents a straight or branched chain alkylene radical having at most 6 carbon atoms, to form a basic ether of the general formula

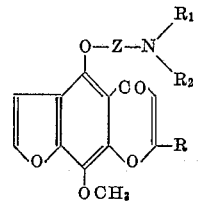

The condensation of the khellinone and a suitable methylisoxazole acid alkyl ester, e.g. an ethyl ester or methyl ester, can be performed in the presence or absence of a suitable organic solvent or diluent, of which ethanol, isopropanol, n-butanol, diethyl ether, di-n-butyl ether, benzene, toluene and xylene are examples. The subsequent ring closure can be completed for example, by boiling the compounds of the general Formula I with concentrated sulphuric acid in ethanol, methanol or also another alcohol. The dimethoxy compounds of the general Formula II are partially hydrolysed to methoxy-hydroxy compounds of the general Formula III, for example, by boiling the former compounds for one to several hours with concentrated hydrochloric acid.

Alkali carbonates such as potassium carbonate or sodium carbonate, or alkali alcoholates, for example, are used as acid binding agents in the reaction of compounds of the general Formula III with reactive esters of basic alcohols of the general Formula IV. When alkali carbonates are used, the reaction medium can be, e.g. benzene, toluene, xylene, acetone or butanone, and, with alkali alcoholates, the reaction medium can be, e.g. a low molecular alkanol, e.g. ethanol or n-butanol. The reactions are performed advantageously at temperatures of between 80 and 140°, possibly in an atmosphere of nitrogen.

Suitable reactive esters of basic alcohols of the general Formula V are, in particular the halides, for example β - dimethylamino - ethyl chloride, β - diethylamino - ethyl chloride, β-di-n-propylamino-ethyl chloride, β-di-n-butylamino-ethyl chloride, β-pyrrolidino-ethyl chloride, β-piperidino-ethyl chloride, β-dimethylamino-propyl chloride, β-dimethylamino-propyl chloride, β-piperidino - propyl chloride, γ-dimethylamino-propyl chloride, γ-diethylamino-propyl chloride, γ-pyrrolidino-propyl chloride, γ-morpholino-propyl chloride, γ-diethylamino-butyl chloride, δ-dimethylamino-butyl chloride, δ-diethylamino-butyl chloride, γ-diethylamino-β-methyl-propyl chloride, γ-diethylamino-β,β-dimethyl-propyl chloride, ε-diethylamino-n-amyl chloride, ω-dimethylamino-n-hexyl chloride and ω-diethylamino-n-hexyl chloride, as well as the corresponding bromides and iodides.

The bases of the general Formula V produced according to the invention form salts, of which some have considerable water solubility, with inorganic and organic acids such as, e.g., hydrochloric acid, hydrobromic acid, hydriodic acid, sulphuric acid, phosphoric acid, methane sulphonic acid, camphorsulphonic acid, ethane disulphonic acid, acetic acid, succinic acid, maleic acid, fumaric acid, malic acid, tartaric acid, citric acid, benzoic acid, phthalic acid or mandelic acid.

Quaternary ammonium compounds are formed in the usual way from the tertiary bases of the general Formula I by adding halides, sulphates or other reactive esters of aliphatic or araliphatic alcohols, e.g. methyl iodide, dimethyl sulphate, ethyl bromide, ethyl iodide, allyl bromide, n-butyl bromide or benzyl chloride.

In addition to the coronary action which is characteristic of khellin, the basic ethers of the general Formula V produced according to the invention also have a marked hypotensive activity and at the same time slight toxicity. In the form of the aqueous solutions of their salts they are much easier to inject than the difficultly soluble khellin. The intermediate products of the general Formula III according to the invention are also suitable as starting materials for other interesting syntheses.

The new compounds can be used in the treatment of bronchial asthma, angina pectoris and myocardial infarction. They may be administered enterally or parenterally.

The following example further illustrates the process according to the invention but it is by no means the only way of performing this process. The temperatures are in degrees centigrade.

*Example*

(a) A mixture of 6 g. of khellinone, 16 g. of 5-methyl-isoxazole-3-carboxylic acid ethyl ester and 1.3 g. of finely distributed sodium is heated for 1½ hours at 100°. The reaction mixture is then left to stand at room temperature for 12 hours whereupon the brown, semi-solid mass is carefully decomposed with ice cold water and, finally, is acidified with dilute sulphuric acid. After standing for a considerable time in an ice bath, the precipitated β-diketo compound is filtered off and, after treating the alcoholic solution with active charcoal, is crystallised from alcohol. 5-[5'-methyl-isoxazole-(3') - carbonyl - acetyl]-4,7-dimethoxy-6-hydroxycoumarone is obtained in the form of small red needles which melt at 158–159° and which, with ferric chloride, produce a red-brown colouration.

The compound obtained is soluble in 4% sodium hydroxide solution and can be again precipitated with hydrochloric acid. It dissolves in concentrated sulphuric acid which gives it a brown colour.

On using 3-methyl-isoxazole-5-carboxylic acid ethyl ester, 5-[3'-methyl-isoxazole-(5')-carbonyl-acetyl]-4,7-dimethoxy-6-hydroxycoumarone is obtained in an analogous manner. It crystallises from alcohol into small red needles which melt at 163.5–164.5°. Ferric chloride gives it a red-brown colour.

(b) 2 g. of the first mentioned β-diketo compound obtained above and a mixture of 200 ccm. of ethanol and 30 ccm. of concentrated sulphuric acid are refluxed for 1 hour. After cooling, the dark red, clear solution is poured into ice water whereupon the 7-[5'-methyl-isoxazolyl - (3')] - 4,9 - dimethoxy - 5H - furano[3,2 - g][1]-benzopyran-5-one, (2-[5''-methyl-isoxazolyl-(3'')]-5,8-dimethoxy-furano[3',2':6,7]-chromone) precipitates. It is filtered off and crystallised from alcohol. It is obtained in the form of small pale yellow needles which melt at 206–208°.

The 7-[3'-methyl-isoxazolyl-(5')]-4,9-dimethoxy - 5H-furano[3,2-g][1]benzopyran-5-one obtained in an analogous manner crystallises from alcohol in the form of small pale yellow needles which melt at 218°.

(c) 0.5 g. of the first compound obtained according to (b) above and 30 ccm. of concentrated hydrochloric acid are refluxed for 3 hours. The compound first dissolves and turns the hydrochloric acid red and then, when still hot, the reaction product begins to separate out. After cooling, the reaction product is filtered off, washed with water and crystallised from alcohol. 7-[5'-methyl-isoxazolyl - (3')] - 4 - hydroxy - 9 - methoxy - 5H-furano[3,2-g][1]benzopyran-5-one, (2-[5''-methyl-isoxazolyl - (3'')] - 5 - hydroxy - 8 - methoxy - furano[3',2':6,7]chromone) is obtained in the form of orange-yellow crystals which melt at 198–199° and which, with ferric chloride, produce a blue-green colouration.

The 7-[3'-methyl-isoxazolyl-(5')]-4-hydroxy - 9 - methoxy - 5H-furano[3,2-g][1]benzopyran - 5 - one produced analogously also forms small orange-yellow crystals from alcohol which melt at 203–204.5° and which, with ferric chloride, produce a blue-green colouration.

(d) 0.3 g. of the first compound obtained according to (c) above are dissolved in 15 ccm. of warm toluene and 1 g. of β-diethylamino-ethyl chloride and 0.3 g. of anhydrous potassium carbonate are added. After refluxing for 24 hours, the inorganic substance is filtered off and the solvent is distilled off under reduced pressure at a slightly raised temperature. A semi-solid substance is obtained as residue. It is dried over clay and recrystallised from dilute alcohol while decolouring with active charcoal. 4-(β-diethylamino-ethoxy)-7-[5'-methyl-isoxazolyl - (3')] - 9 - methoxy - 5H - furano[3,2 - g][1]benzopyran - 5 - one, (2 - [5''-methyl-isoxazolyl-(3'')]-5-(β-diethylamino - ethoxy) - 8 - methoxy - furano[3',2':6,7]-chromone), is obtained in the form of small, pale yellow needles which melt at 106°. With ferric chloride, the product produces no colouration. It dissolves in dilute hydrochloric acid and is again precipitated with ammonia.

To produce the picrate, 0.1 g. of the above base is dissolved in as little warm alcohol as possible, a few ccm. of saturated alcoholic picric acid solution are added and the whole is refluxed for 10 minutes. On cooling, the picrate separates out. It is filtered off and recrystallised from alcohol whereupon it is obtained in the form of small yellow crystals which melt at 178–180°.

4 - (β - diethylamino - ethoxy) - 7 - [3' - methyl - isoxazolyl - (5')] - 9 - methoxy - 5H - furano[3,2 - g][1]benzopyran-5-one, 4 - (γ - pyrrolidyl - (1') - propoxy) - 7 - [5' - methyl-isoxazolyl - (3')] - 9 - methoxy - 5H - furano[3,2 - g]-[1]benzopyran-5-one, 4 - (γ - dimethylamino - propoxy) - 7 - [5' - methyl - isoxazolyl - (3')] - 9 - methoxy - 5H - furano[3,2 - g][1]-benzopyran-5-one, 4 - (β - piperidino - ethoxy) - 7 - [5' - methyl - isoxazolyl-(3')] - 9 - methoxy - 5H - furano[3,2 - g][1]benzopyran-5-one, and 4 - (δ - morpholino - butoxy) - 7 - [5' - methyl - isoxazolyl-(3')] - 9 - methoxy - 5H - furano[3,2 - g][1]benzopyran-5-one are produced in an analogous manner.

What I claim is:

1. A basic ether of the formula

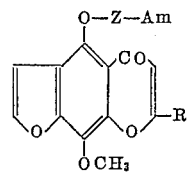

wherein R represents a member selected from the group consisting of 5-methyl-isoxazolyl-(3) and 3-methyl-isoxazolyl-(5), Z represents alkylene having at most 6 carbon atoms, and Am represents a member selected from the group consisting of lower dialkylamino, 1-pyrrolidyl, piperidino and morpholino.

2. 4 - (β - diethylamino - ethoxy) - 7 - [5' - methyl-isoxazolyl - (3')] - 9 - methoxy - 5H - furano[3,2 - g][1]-benzopyran-5-one.

3. 4 - (β - diethylamino - ethoxy) - 7 - [3' - methyl-isoxazolyl - (5')] - 9 - methoxy - 5H - furano[3,2 - g][1]-benzopyran-5-one.

4. 4 - (γ - pyrrolidyl - (1') - propoxy) - 7 - [5' - methyl-isoxazolyl - (3')] - 9 - methoxy - 5H - furano[3,2 - g][1]-benzopyran-5-one.

5. 4 - (β - piperidino - ethoxy) - 7 - [5' - methyl-isoxazolyl - (3')] - 9 - methoxy - 5H - furano[3,2 - g]-[1]benzopyran-5-one.

6. 4 - (δ - morpholino - butoxy) - 7 - [5' - methyl-isoxazolyl - (3')] - 9 - methoxy - 5H - furano[3,2 - g][1]-benzopyran-5-one.

7. 4 - (γ - dimethylamino - propoxy) - 7 - [5' - methyl-isoxazolyl - (3')] - 9 - methoxy - 5H - furano[3,2 - g][1]-benzopyran-5-one.

No references cited.